Patented July 21, 1942

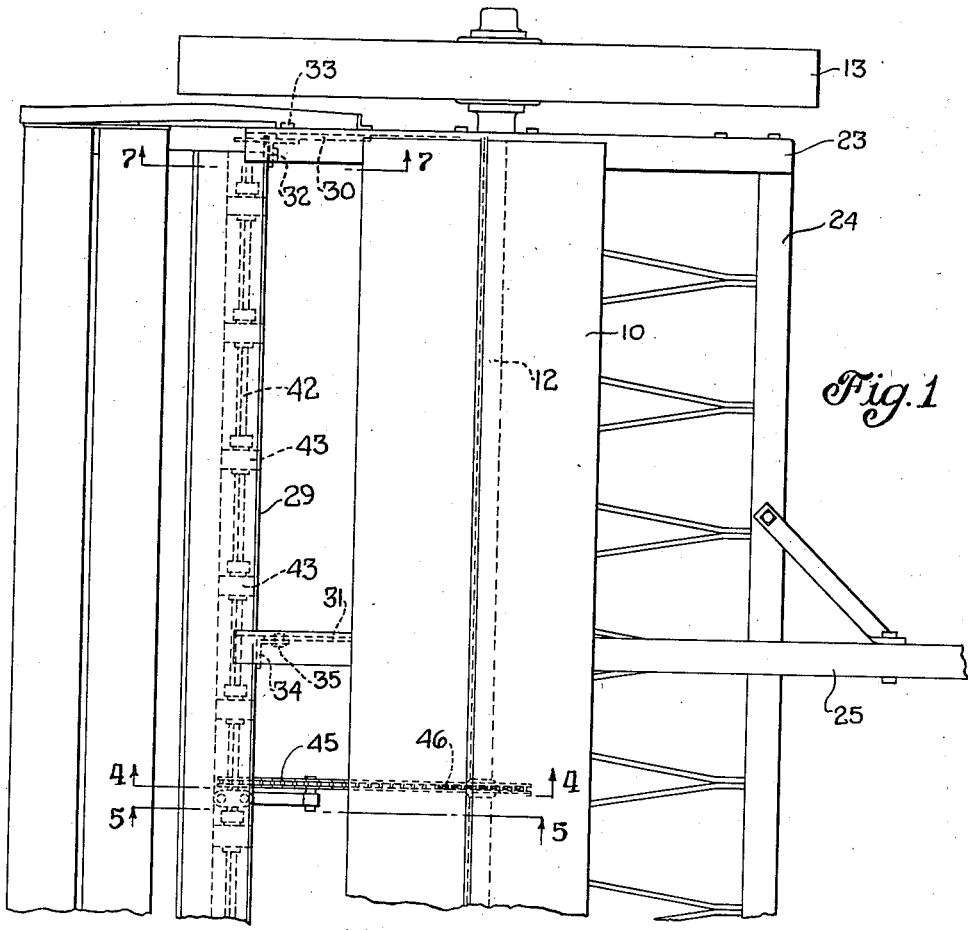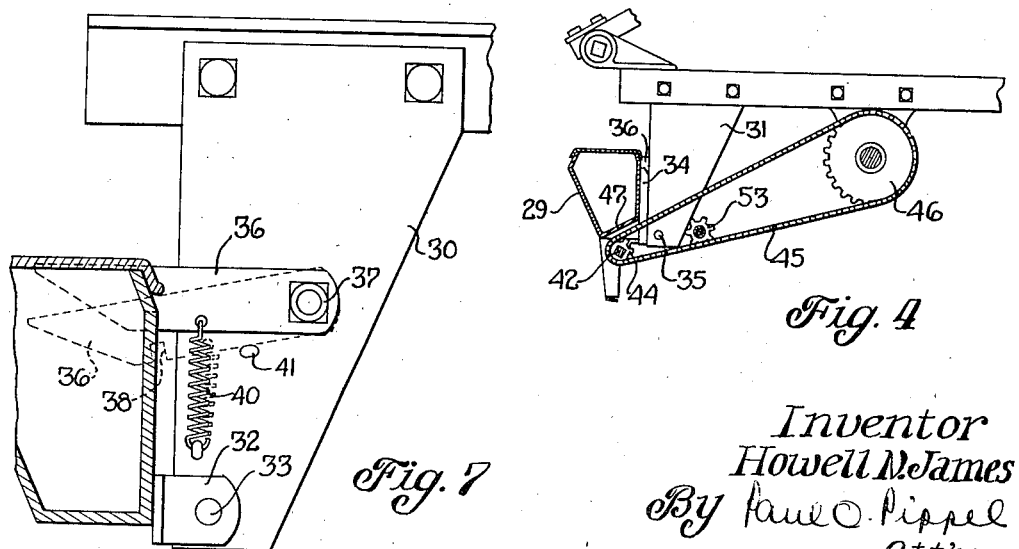

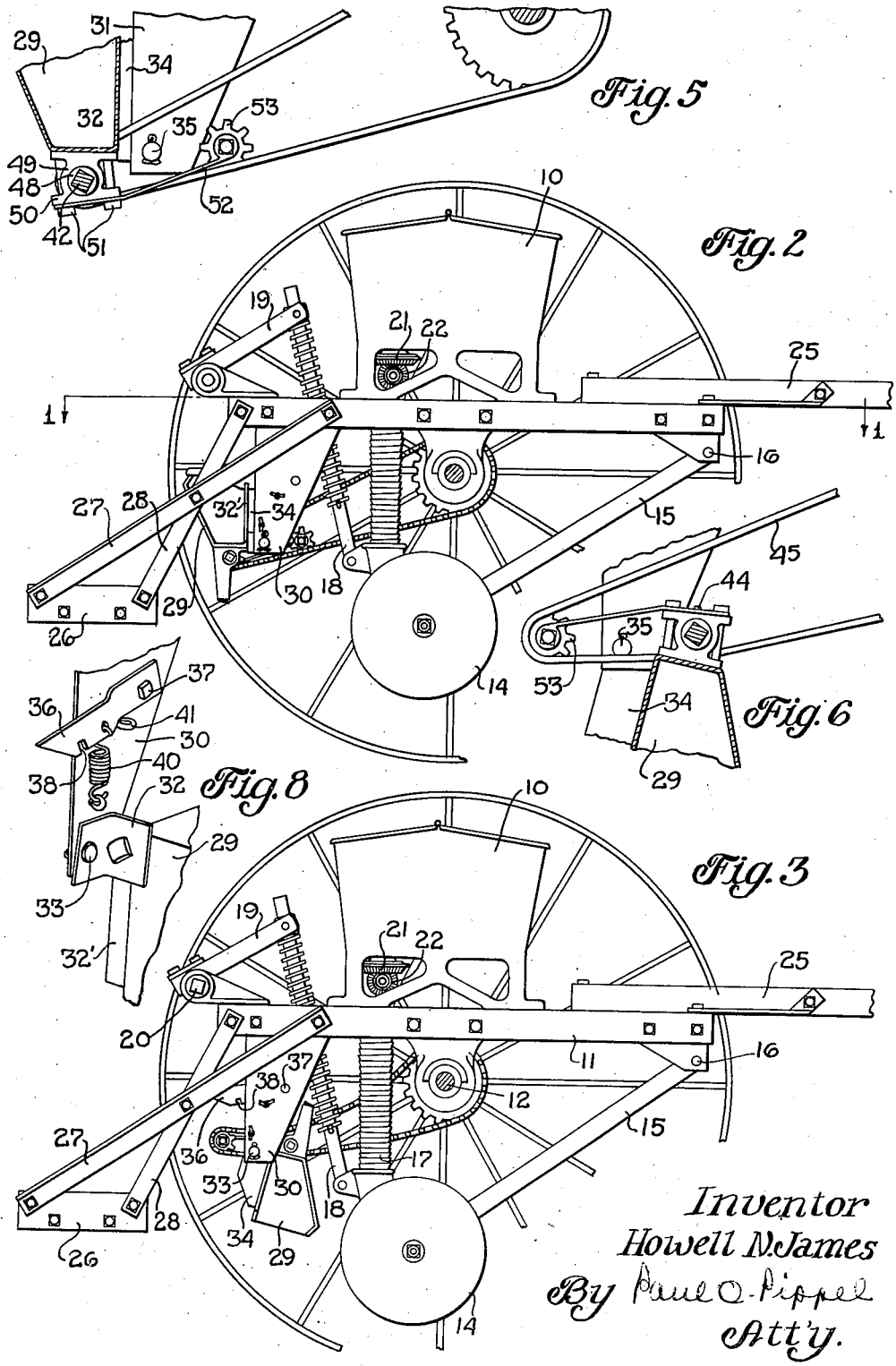

2,290,240

UNITED STATES PATENT OFFICE 2,290,240

SEEDING ATTACHMENT

Howell N. James, Hamilton, Ontario, Canada, assignor, by mesne assignments, to International Harvester Company, Chicago, Ill., a corporation of New Jersey Application July 12, 1940, Serial No. 345,162

6 Claims. (Cl. 111—52)

This invention relates to a seeding attachment. More specifically it relates to a grass seeding attachment to be attached as an auxiliary to a planter.

Planters are well known which include both a main seed hopper for crops such as oats and an auxiliary seed hopper for crops such as clover. The two crops may be planted at once and are harvested at different times because of the difference in their rates of growth.

An object of the present invention is to provide an improved seeding attachment.

Another object is to provide an improved auxiliary seeder for a planter.

A further object is the provision of a seeding attachment for a planter which is so attached to the planter as to be capable of being dumped for removal of seed such as grass with a minimum loss of the seed.

According to the present invention a regular planter which includes an axle supported frame and hoppers thereon has also an auxiliary seeding attachment pivotally carried at the rear of and below the frame in such a way that it can be swung to a dumping position and thereby be brought near the ground so as to prevent to a maximum degree a loss of seed.

In the drawings:

Figure 1 is a plan view of a planter including the novel seeding attachment of the present invention;

Figure 2 is an elevational view of the structure shown in Figure 1;

Figure 3 is a view similar to Figure 2 but showing the seeding attachment in dumping position;

Figure 4 is a sectional view taken along the lines 4—4 of Figure 1;

Figure 5 is a sectional view taken along the line 5—5 of Figure 1;

Figure 6 is a sectional view similar to Figure 5 but showing the seeding attachment in dumping position;

Figure 7 is a sectional view taken along the line 7—7 of Figure 1; and,

Figure 8 is a perspective view in detail showing the mounting of the seeding attachment.

The planter to which the seeding attachment of the present invention is attached comprises a hopper construction 10 with separate compartments for both seed and fertilizer, a frame 11 upon which the hopper construction 10 is mounted, an axle 12 extending beneath and supporting the frame 11, and wheels 13 at the ends of the axle, of which only one is shown. The planter also includes a plurality of furrow openers only one furrow opener 14 being shown. This opener is mounted for vertical adjustment with respect to the frame 11 on a member 15 pivotally attached at 16 to the frame. A flexible hose 17 connects the hopper construction 10 with the furrow opener 14. Lifting of the furrow opener from a ground-engaging position to the raised position of Figures 2 and 3 is accomplished by means of a link 18 connected to an arm 19 secured to a rock-shaft 20 mounted on the frame 11. A pair of bevel gears 21 and 22 drives mechanism, not shown, for feeding fertilizer and grain from the hopper construction 10. The gear 22 drives the gear 21 and is itself driven by the axle 12, in a manner not shown since it forms no part of the present invention. The frame 11 comprises side members 23, of which only one is shown, a transverse member 24 connecting the forward ends of the side members 23 and a centrally extending member 25 to which a source of draft power, not shown, may be attached. An operator's platform 26 is carried at the rear of the frame by means of pairs of members, of which only one pair comprising members 27 and 28 at one end of the platform is shown.

The seeding attachment which forms the subject-matter of the present invention comprises a hopper 29 carried at the rear of and below the frame 11 by a pair of plate members 30 secured to the side members 23 of the frame 11 and a member 31 secured to the centrally extending member 25 of the frame 11. Angles 32 are secured adjacent the base of the hopper 29 at its ends to extensions 32' of the rear vertical wall of the hopper and are pivotally carried on the plate members 30 by means of pins 33. (See Figures 1, 7, and 8.) An angle member 34 is secured to the base of the hopper 29 at a midpoint and is pivotally carried on the plate member 31 by means of a pin 35. (See Figures 1, 4, 5, and 6.) In the normal operating position of the seeding attachment comprising the hopper 29, the hopper extends generally upwardly from its pivot point on the members 30 and 31 comprising pins 33 and 35. The hopper is retained in this position by means of elements 36 pivoted to the plate members 30 by means of pins 37. (See Figures 3, 7, and 8.) These elements 36 each have a notch 38 which engages the extension 32' of each end of the hopper 29. A spring 40 keeps the notch 38 of each element 36 in engagement with an extension 32.

As seen in Figure 1, a drive shaft 42 extends lengthwise of the hopper 29 and carries at spaced points feed devices 43 of the type shown in the patent to Johnson et al. 1,712,797, May 14, 1929. The shaft 42 is driven by a gear 44 secured to the shaft and driven by a belt or chain 45 driven in turn by a gear 46 secured to the axle 12. As seen in Figure 4, the base of the hopper 29 is shaped for a short section as at 47 to provide space for the chain 45. As seen in Figure 5, a bearing collar 48 is secured to the shaft 42 and is journaled in a bearing formed in halves, 49 and 50, secured by bolts 51 at approximately a mid-point of the hopper 29. The bolts 51 also serve to secure a strip of spring steel 52 to the bearing half 50. The free end of the strip 52 supports an idler gear 53 engaging the chain 45. As will be seen from Figures 4 and 5, the idler gear 53 is generally on the side of the pin 35 which serves as the pivot point of the hopper 29, opposite the gear 44 which serves to drive the shaft 42. Figures 3, 6, and 8 show the hopper 29 in a dumping position in which it extends generally downward from its pivot point comprising the pins 33 and 35. It will be observed from Figure 6 that in this position the idler gear 53 and the drive gear 44 have generally traded places, so that no great amount of slack is put in the chain 45 when the hopper is in the dumping position. Consequently, the chain 45 will not be taken out of engagement with the driving gear 46 on the axle 12 and the drive gear 44 for the shaft 42 when the hopper 29 is in dumping position. The spring steel strip 52 supporting the idler gear 53 permits a shifting of the gears 44 and 53 about the pins 33 and 35 from normal operating position to dumping position without too great a strain on the chain 45.

It will be observed from the drawings that the position of the hopper 29 in normal operating position is relatively low with respect to the hopper construction 10, since the hopper 29 is carried beneath the frame 11. It is also to be noted from Figure 3 that in the dumping position the hopper 29 is relatively close to the ground. Consequently, any seed which is carried in the hopper 29, for example, grass, will not spread about very much during dumping of the hopper. This is of advantage particularly in the case of an expensive seed such as grass, since spreading about of the seed would entail a considerable loss.

The regular use of an auxiliary seeding attachment such as the hopper 29 in conjunction with a regular planter is well understood and will be referred to only briefly. For example, the hopper construction 10 will carry oats and fertilizer and the seeding attachment or hopper 29 may carry clover. The oats and the clover are planted at the same time and may be harvested at different times because of their different rates of growth. The hopper 29 may also be used for planting grass simultaneously with other crops.

It will be apparent from the foregoing description that a new and novel seeding attachment for a planter has been provided, which attachment is pivotally mounted on the planter at a relatively low point and swings downwardly below its pivot point to a dumping position so that the seed dumped from the hopper will not spread about. Disengagement of the chain which drives the hopper does not occur in movement of the hopper to dumping position, since an idler gear carried by the hopper on generally the opposite side of the pivot point of the hopper from the drive gear for the hopper keeps the chain substantially without slack.

The intention is to limit the invention only within the scope of the appended claims.

What is claimed is:

1. In combination, a supporting frame, a seeding attachment having at a point adjacent its base a pivotal mounting on the frame so as to be adapted to swing to dumping position in which the attachment extends below the point, first and second gears for driving the seeding attachment mounted on the attachment and the support, respectively, at points spaced from the said pivotal mounting, a chain engaging the gears for transmitting power from the second gear to the first gear, an idler gear engaging the chain, and a resilient strip connecting the seeding attachment and the idler gear and supporting the same on the side of the said pivotal mounting generally opposite the first gears, whereby the idler gear prevents the chain from becoming disengaged from the first and second gears in the dumping position of the seeding attachment.

2. In combination, an axle, wheels supporting the axle, a frame having a main portion supported on and positioned over the axle and an auxiliary portion depending from the main portion rearwardly of and below the axle, a seeder secured to the main portion of the frame and extending upwardly therefrom over the axle, and a seeding attachment positioned below the main portion of the frame rearwardly of the axle and having at a point adjacent the base of the attachment a pivotal mounting on the auxiliary portion of the frame, whereby the seeding attachment may be swung to a dumping position in which it extends below its pivotal mounting to a point adjacent the ground, and further including means connecting the axle and the seeding attachment for driving the attachment from the axle, and means for preventing disconnection of the means upon swinging of the seeding attachment to dumping position.

3. In combination, a frame, a seeder secured thereto and extending upwardly therefrom, a seeding attachment positioned rearwardly of the seeder below the frame, means connecting the seeding attachment and the frame for providing a pivotal mounting for the attachment with respect to the frame at a point on the attachment adjacent its base, an axle supporting the frame, a first gear mounted on the seeding attachment for driving the same, a second gear mounted on the axle, a chain for transmitting power from the second gear to the first gear, an idler gear meshing with the chain, and a resilient element supporting the idler gear on the seeding attachment on the side of the said pivotal mounting opposite the first gear, whereby the seeding attachment may be swung to a dumping position in which it extends below its pivotal mounting to a point near the ground, and the idler gear keeps the chain in engagement with the first and second gears during movement of the seeding attachment to dumping position.

4. In combination, a supporting frame, a material-depositing device having mechanism adapted to be driven for depositing material, means forming a pivotal mounting for the device on the supporting frame to enable the device to be swung from a material-depositing position to a dumping position, a first drive member for driving the mechanism of the device and being mounted on the device at a point spaced from the pivotal mounting, a second drive member mounted on the supporting frame at a point spaced from the pivotal mounting, means connecting the drive members for transmitting drive from the second drive member to the first drive member, and means connected with the device so as to swing therewith with respect to the frame for causing the drive-transmitting means to be held connected with both drive members during the swinging of the device from material-depositing position to dumping position.

5. In combination, a supporting frame, a seeding device having mechanism adapted to be driven for depositing seed, means forming a pivotal mounting for the device on the supporting frame to enable the device to be swung from a seed-depositing position to a dumping position, a first rotatable drive member for driving the mechanism of the device and being mounted on the device at a point spaced from the pivotal mounting, a second rotatable drive member mounted on the supporting frame at a point spaced from the pivotal mounting, means connecting the drive members for transmitting drive from the second drive member to the first drive member, and means connected with the device so as to swing therewith with respect to the frame for causing the drive-transmitting means to be held connected with both drive members during the swinging of the device from seed-depositing position to dumping position.

6. In combination, a supporting frame, a seeding device having mechanism adapted to be driven for depositing seed, means forming a pivotal mounting for the device on the supporting frame to enable the device to be swung from a seed-depositing position to a dumping position, a first sprocket for driving the mechanism of the device and being mounted on the device at a point spaced from the pivotal mounting, a second sprocket mounted on the supporting frame at a point spaced from the pivotal mounting, a sprocket chain engaging the sprockets so as to transmit drive from the second sprocket to the first sprocket, and an idler sprocket connected with the seeding device on the side of the pivot generally opposite the first sprocket for holding the sprocket chain in engagement with the first and second sprockets during the swinging of the seeding device from seed-depositing position to dumping position.

HOWELL N. JAMES.